United States Patent
Kim et al.

(10) Patent No.: US 10,152,732 B2
(45) Date of Patent: Dec. 11, 2018

(54) METHODS, SYSTEMS, AND APPARATUS TO DESIGN ONLINE ADVERTISING UNITS VIA A WEB-BASED APPLICATION

(71) Applicant: INTERPOLS NETWORK INCORPORATED, Pasadena, CA (US)

(72) Inventors: Peter H. I. Kim, Pasadena, CA (US); Hyo Lee, Pasadena, CA (US); Joe Park, Torrance, CA (US); Sang-Yun Oh, Stanford, CA (US)

(73) Assignee: INTERPOLS NETWORK INCORPORATED, Pasadena, CA (US)

( * ) Notice: Subject to any disclaimer, the term of this patent is extended or adjusted under 35 U.S.C. 154(b) by 184 days.

(21) Appl. No.: 14/956,307

(22) Filed: Dec. 1, 2015

(65) Prior Publication Data
US 2016/0162956 A1 Jun. 9, 2016

Related U.S. Application Data

(63) Continuation of application No. 12/024,832, filed on Feb. 1, 2008, now Pat. No. 9,202,231.
(Continued)

(51) Int. Cl.
*G06Q 30/02* (2012.01)
*G06F 17/30* (2006.01)
(Continued)

(52) U.S. Cl.
CPC ..... *G06Q 30/0276* (2013.01); *G06F 17/2235* (2013.01); *G06F 17/30014* (2013.01);
(Continued)

(58) Field of Classification Search
CPC ........... G06F 17/2235; G06F 17/30014; G06F 17/30017; G06F 17/3089; H04L 67/025;
(Continued)

(56) References Cited

U.S. PATENT DOCUMENTS

| | | | |
|---|---|---|---|
| 7,047,302 B1* | 5/2006 | Chatani | A63F 13/12 705/14.73 |
| 2002/0103698 A1 | 8/2002 | Cantrell | |
| 2003/0014479 A1* | 1/2003 | Shafron | G06F 17/30873 709/203 |
| 2003/0163372 A1* | 8/2003 | Kolsy | G06F 17/3089 705/14.49 |
| 2004/0148424 A1 | 7/2004 | Berkson et al. | |
| 2004/0260767 A1 | 12/2004 | Kedem et al. | |
| 2005/0197164 A1* | 9/2005 | Chan | G06Q 30/02 455/566 |

(Continued)

OTHER PUBLICATIONS

Dongyoung Sohn, "The Role of Expected Interactivity in Interactive Ad Processing", Mar. 2003, Paper presented at the 2003 Annual Conference American Academy of Advertising, pp. 28 (Year: 2003).*

*Primary Examiner* — Chau T Nguyen
(74) *Attorney, Agent, or Firm* — Procopio, Cory, Hargreaves & Savitch LLP

(57) ABSTRACT

A system for creating a new advertisement unit is disclosed. The system can include a web browser, an ad server, and an advertisement creator server. The ad server is communicatively connected to the web browser, the ad server can be configured to store and deliver a plurality of advertisement units, and an advertisement creator server communicatively connected to the web browser and can be configured to host an ad creator engine, the ad creator engine can be configured to facilitate the creation of the new advertisement unit, wherein the web browser is configured to function as a graphical interface with the advertisement creator engine.

9 Claims, 10 Drawing Sheets

Related U.S. Application Data

(60) Provisional application No. 60/887,755, filed on Feb. 1, 2007.

(51) Int. Cl.
*G06F 17/22* (2006.01)
*H04L 29/08* (2006.01)

(52) U.S. Cl.
CPC .... *G06F 17/30017* (2013.01); *G06F 17/3089* (2013.01); *G06Q 30/02* (2013.01); *G06Q 30/0241* (2013.01); *H04L 67/025* (2013.01)

(58) Field of Classification Search
CPC . G06Q 30/02; G06Q 30/0241; G06Q 30/0276
See application file for complete search history.

(56) References Cited

U.S. PATENT DOCUMENTS

| | | |
|---|---|---|
| 2006/0277102 A1* | 12/2006 | Agliozzo ............... G06Q 30/02 705/14.41 |
| 2007/0043616 A1 | 2/2007 | Kutaragi et al. |
| 2007/0050372 A1 | 3/2007 | Boyle |
| 2007/0061837 A1 | 3/2007 | Dadush |
| 2007/0078726 A1* | 4/2007 | MacDonald Korth ...................... G06Q 10/06 705/26.1 |
| 2007/0146812 A1 | 6/2007 | Lawton |
| 2007/0204002 A1 | 8/2007 | Calderone |

* cited by examiner

RICH MEDIA AD CREATOR

Please enter your contact information

NAME: Agency Staff
EMAIL: user@agency.com  ← 302
PHONE: 626-555-1212

Please enter your banner information

NAME: Test Banner
WIDTH: 300  ← 304
HEIGHT: 250

START DESIGNING >>

*interpolls*

Trouble starting? Contact Us
COPYRIGHT © 1999-2007 INTERPOLLS. ALL RIGHTS RESERVED

FIGURE 3

METHODS, SYSTEMS, AND APPARATUS TO DESIGN ONLINE ADVERTISING UNITS VIA A WEB-BASED APPLICATION

CLAIM OF PRIORITY AND RELATED APPLICATIONS INFORMATION

This application claims priority to and is a continuation of U.S. patent application Ser. No. 12/024,832, entitled "METHODS, SYSTEMS, AND APPARATUS TO DESIGN ONLINE ADVERTISING UNITS VIA A WEB-BASED APPLICATION," filed Feb. 1, 2008, now U.S. Pat. No. 9,202,231, issued on Dec. 1, 2015, which claims priority under 35 U.S.C. 119(e) to U.S. Provisional patent application Ser. No. 60/887,755, entitled "METHODS, SYSTEMS, AND APPARATUS TO DESIGN ONLINE ADVERTISING UNITS VIA A WEB-BASED APPLICATION," filed Feb. 1, 2007. This application is also related to U.S. patent application Ser. No. 11/750,872, entitled "SYSTEMS AND METHODS FOR DELIVERY OF MULTIPLE ONLINE ADVERTISING UNITS TO COMMUNICATE AND INTERACT ON THE SAME WEBPAGE," filed May 18, 2007, U.S. patent application Ser. No. 11/933,387, entitled "SYSTEMS AND METHODS FOR INTERACTIVELY DELIVERING SELF-CONTAINED ADVERTISEMENT UNITS TO A WEB BROWSER," filed Oct. 31, 2007, and U.S. patent application Ser. No. 11/469,630, entitled "SYSTEMS AND METHODS FOR INTEGRATING XML SYNDICATION FEEDS INTO ONLINE ADVERTISEMENT," filed Sep. 1, 2006. The entireties of the disclosures of the above-identified applications are incorporated herein by reference as if set forth in full.

BACKGROUND

1. Technical Field

The embodiments disclosed in this application generally relate to Internet advertising and more specifically to Internet techniques and design tools for creating online advertisements.

2. Related Art

With the proliferation of advertising on the Internet and the resulting marketing overload experienced by many Internet users, it is becoming increasingly important for Internet ad units to differentiate themselves from "rest of the crowd." Rich-media ads are becoming the norm as they can deliver content that is animated, makes sounds, interacts with users, etc. Correspondingly, Internet marketing schemes have become more elaborate and sophisticated, sometimes involving multiple ad units being delivered for simultaneous viewing by a user.

Most Internet advertising units are self-contained entities on the webpage that they're rendered on. When multiple (2 or more) ad units are rendered on the same webpage, the units can be made to behave like they are interacting with each other by playing pre-scripted timed animation or by hard coding the ad units such that they require web publishers to serve them together on the same webpage at the same time to ensure proper functionality. This level of programming or pre-scheduling by the web publisher significantly limits their flexibility in creating complex advertising schemes that utilize multiple ad units that are non-synchronously rendered on a webpage.

Currently, there are no web based ad creators with the capability to include both static content and rich media. In order to create add units with more than basic flat display ads, one must purchase a stand alone application (e.g. MACROMEDIA FLASH™, PHOTOSHOP ILLUSTRATOR™, IMAGE READER™, MICROSOFT SILVERLIGHT™, etc.) that a developer runs on a local computer.

SUMMARY

Systems and methods for web-based generation of advertisement units, are disclosed.

In one aspect, a system for creating a new advertisement unit is disclosed. The system can include a web browser, an ad server, and an advertisement creator server. The ad server is communicatively connected to the web browser, the ad server can be configured to store and deliver a plurality of advertisement units, and an advertisement creator server communicatively connected to the web browser and can be configured to host an ad creator engine, the ad creator engine can be configured to facilitate the creation of the new advertisement unit, wherein the web browser is configured to function as a graphical interface with the advertisement creator engine.

In another aspect, a method of creating an advertisement unit by an advertisement creation server can include defining the dimensions of the advertisement unit, adding content objects to the advertisement unit, adding attributes to the content objects, adjusting the layout of the content with respect to the advertisement unit, previewing the advertisement unit, and submitting the advertisement unit.

In another aspect, a method of creating multiple advertisement units that communicate and interact with each other on a webpage can include defining the dimensions of a first advertisement unit and a second advertisement unit, adding content objects to the first advertisement unit and the second advertisement unit, adding attributes to each content objects, adjusting the layout of the content within the first advertisement unit and the second advertisement unit, defining the relationship between the first advertisement unit and the second advertisement unit, wherein the first advertisement unit and the second advertisement unit are configured to be communicatively interfaced with one another, defining the instructions which apply to the first advertisement unit and the second advertisement unit when both advertisement units share common attributes, previewing the first advertisement unit and the second advertisement unit, and submitting the first advertisement unit and the second advertisement unit.

These and other features, aspects, and embodiments are described below in the section entitled "Detailed Description."

BRIEF DESCRIPTION OF THE DRAWINGS

Features, aspects, and embodiments are described in conjunction with the attached drawings, in which:

FIG. 3, is a screenshot illustrating a method to define the dimensions of an advertisement unit that can be included in the diagram of FIG. 2, in accordance with one embodiment.

DETAILED DESCRIPTION

Embodiments herein are described and directed for systems and methods for web-based creation of advertising units. It will be obvious, however, that the embodiments may be practiced without some or all of these specific details. In other instances, well known process operations have not been described in detail in order not to unnecessarily obscure the present invention.

As used herein, the Internet, the Web, or World Wide Web (WWW) uses a hypermedia (i.e., comprising of graphics, audio, video, plain text, hyperlinks, etc.) based system for enabling the browsing of Internet sites. As its name implies, the WWW (i.e., Internet) is comprised of many websites linked together allowing users to travel from one website to another simply by clicking on hyperlinks. To access the web, a user (i.e., client) typically runs a web browser program (e.g., FIREFOX™, NETSCAPE™, INTERNET EXPLORER™, SAFARI™, OPERA™, CAMINO™, etc.) that assists the user in navigating from among the various websites on the WWW and renders the web pages associated with those websites for viewing by the user.

Webpages are typically written in HyperText Markup Language (HTML), Dynamic HyperText Markup Language (DHTML) or Extensible HyperText Markup Language (XHTML). DHTML denotes a collection of technologies used together to create interactive and animated web sites by using a combination of a static markup language (i.e., HTML), a client-side scripting language (such as JAVASCRIPT™), a presentation definition language (i.e., CSS), and a Document Object Model. DHTML based webpages use client-side scripting to change the variables of the presentation definition language (i.e., HTML) to affect the look and function of otherwise "static" HTML page content, after the page has been fully loaded and during the rendering process.

Internet advertisements can take any form as along as it can be rendered onto a web browser or equivalent application. Examples include: static graphical banners, interactive polls, interactive games, multimedia clips, streaming video, etc. Rich-media denotes interactive multimedia web content that includes audio, graphics, image, video and animation in addition to traditional media (text and graphics).

In view of the foregoing, it should therefore be fully appreciated that a variety of Internet advertising content (e.g., animated ads, interactive polls, multi-media ads, etc.) can benefit from the systems and methods described herein.

Figure 1:
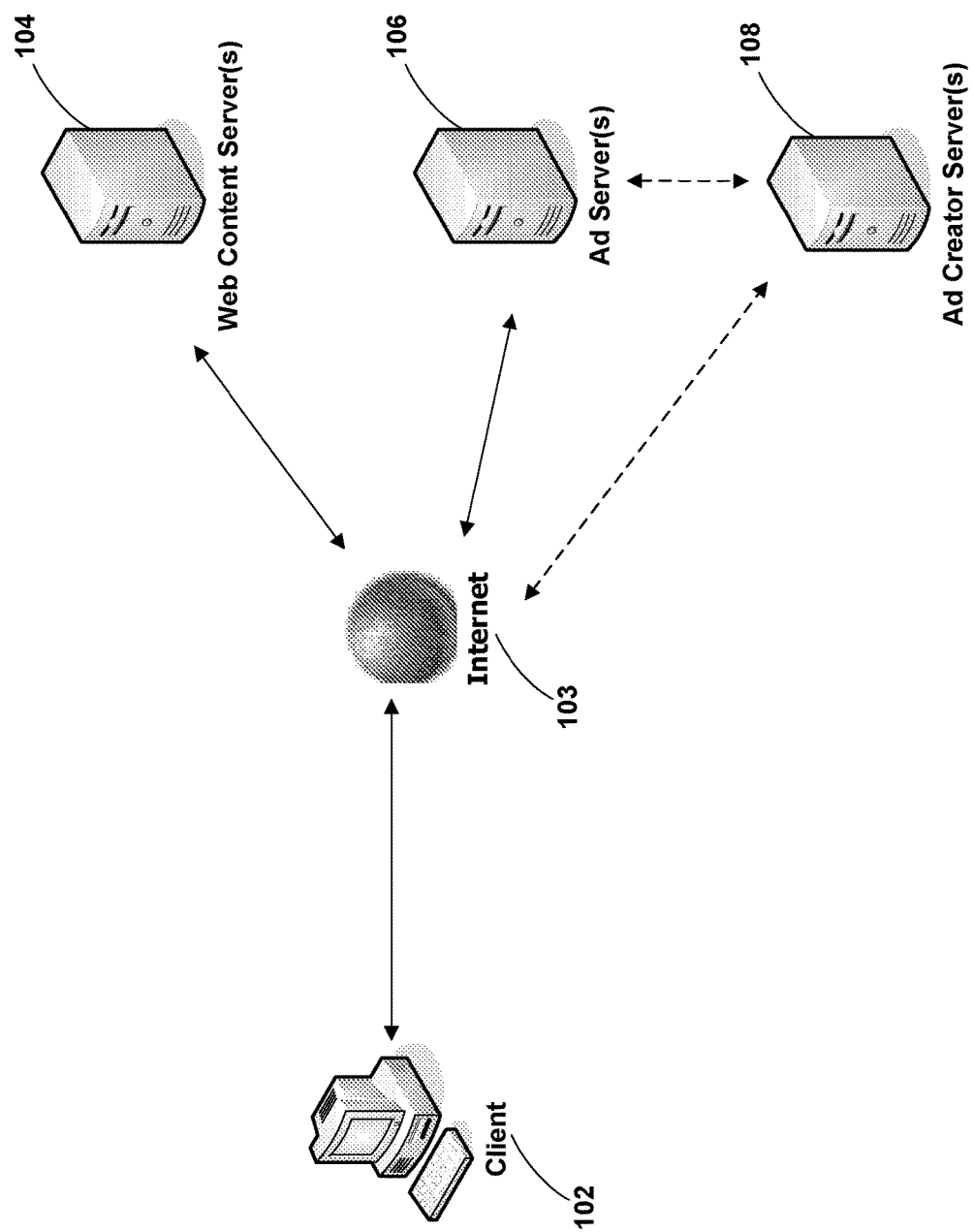
FIG. 1, is a block diagram illustrating a wide area network (WAN) for creating and delivering Internet advertisement units that communicate and interact with each other on a webpage, in accordance with one embodiment.

FIG. 1, is a block diagram illustrating a wide area network (WAN) for creating and delivering Internet advertisement units that communicate and interact with each other on a webpage, in accordance with one embodiment. Such a network can be used for delivering Internet advertisement units that interact with each other on a webpage, and for delivering web-based advertisement generating content in accordance with one embodiment. Referring to FIG. 1, the system can include a client 102 (hosting a web browser) in communication by way of the Internet 103 with a web content server 104, an ad server 106 and an ad creator server 108 that is communicatively connected to the ad server 106. It should be appreciated that the client 102 can be in communications with multiple servers of each server type (e.g., web content server 104, ad server 106, etc.) and that single servers were used in this depiction for the sake of simplicity and is not intended to limit the scenario to single servers of each server type.

During an Internet 103 web surfing session, the client 102 makes a request for a web page from the web content server 104, which is configured to send the requested page back to the client 102 in the form of a Hypertext Markup Language (HTML) or equivalent file type (e.g., Extensible Markup Language (XML), Extensible Hypertext Markup Language (XHTML), and Extensible Bindings Language (XBL)). Embedded within the web page is a script that instructs the clients' 102 web browser to send a request for advertisement units to be sent from the ad server 106 to the client 102. Examples of programming languages that can be used to create the script include, JAVASCRIPT™, VBSCRIPT™, and ACTIONSCRIPT™. It should be understood, however, that the script can be created using any programming language as long as it can be processed by the client's 102 web browser to initiate a request for an advertisement panel from the ad server 106.

Continuing with FIG. 1, once the script is delivered to the ad server 106, the Internet ad unit is generated and then returned to the web browser. There it is rendered onto or as part of the webpage by the web browser. The Internet ad unit is configured to detect, register and interact with other Internet ad units that have already been rendered on the same webpage and share the same common attributes. In one embodiment, the common attributes are that the Internet ad units share the same ad campaign objectives. That is, the ad units are geared towards the same marketing objectives. For example, the ad units may all be geared towards getting Internet users to visit a website that is selling product "A." Therefore, a first ad unit may have a banner ad relating to product "A," a second ad unit may play streaming video about the same product, while a third ad unit may present polls asking users to rate features they would like product "A" to have.

In another embodiment, the common attributes are that the Internet ad units share the same client. For example, all the Internet ad units may share Company "A" as a common client. Alternatively, a first Internet ad unit may relate to Subsidiary "A," while a second Internet ad unit may relate to Subsidiary "B", both subsidiaries "A" and "B" belonging to Company "A."

In still another embodiment, the common attributes are that the Internet ad units relate to the same client type. For example, the ad units may all relate to clients in the same industry (i.e., automotive industry), industry sub-segment (e.g., automotive parts, automotive repair, car dealerships, etc.), or other common trait (e.g., clients who cater to selected professionals, demographics, genders, etc.). In a different embodiment, the common attributes are that the Internet ad units relate to certain custom features within the ad units. For example, these ad units can be setup in any arbitrary way for them to be connected with other ads. That is, the common attributes can be that the ads have a combination of the same clients, same advertising campaign or interact simply because they happen to be served onto a same page. Essentially any detectable ad feature can be mixed and matched as common attributes.

It should be appreciated, however, that these are just examples of some common shared attributes between Internet ad units and that the shared attributes can essentially be any characteristic as long as it can be recognized by programmable logic infused into the ad units. That is, essentially any arbitrary condition can be programmed into the main ad units and auxiliary ad units for them to flag and recognize each other. For example, the "master" unit can be configured to specifically seek out a particular "slave" unit with particular questions and have the master unit completely change the look and feel of the slave unit.

In one embodiment, when multiple ad units are rendered on the same webpage, they are each classified as either a "main" ad unit or an "auxiliary" ad unit. A main ad unit is configured to be programmed with specific ad campaign goals and objectives so that it can generate and send instructions to the auxiliary ad units to implement those objectives. Additionally, the main ad unit is configured such that it can generate and send instructions to the auxiliary ad units based on how a user interacts it. That is, the main ad unit can determine what actions by the auxiliary ad units are necessary based on the ad campaign objectives entered by a system administrator and/or interactivity with a user; then, generate and communicate the appropriate instructions to the auxiliary ad units.

Still with FIG. 1, typically, there is only one main ad unit per each class of Internet ad units with the same shared attributes. For example, there may be several groups of ad units each having a different class of shared attributes (e.g., shared client, shared marketing objectives, shared subject matter, etc.) that may be rendered on a webpage. But for each of the groups of ad units, only one of the ad units can be designated a main ad unit, while the rest of the ad units in the group are designated as auxiliary ad units.

The auxiliary ad units are configured to detect the presence of a rendered main ad unit on a webpage, register itself with the main ad unit and make itself available for communication and control by the same. That is, the auxiliary ad units serve a subservient role to the main ad unit by taking instructions from the same.

In one embodiment, the instructions generated by the main ad unit are imbedded with messaging, images, rich media content and technical features that are designed to enhance the utility of the auxiliary ad units. Examples of the types of rich-media content that can be embedded in the instructions include, but are not limited to, streaming video, questions, data forms, coupons, multiple universal resource locators (URLs), XML feeds, and other advanced features that can be implemented in HTML. It should be appreciated, however, that essentially any technical feature and/or content type can be imbedded into the instructions and communicated to the auxiliary ad units as long as it can be rendered on a webpage.

The auxiliary ad units do not have to be pre-scripted. Programming code, such as JAVASCRIPT™, VBSCRIPT™, and ACTIONSCRIPT™, can be used to inject new code into the auxiliary ad units and completely replace their original functionality. For example, the questions on the auxiliary ad unit can be changed, the auxiliary ad unit can be changed into some other type (e.g., banner, video feed, etc.) of ad unit, the auxiliary ad can be turned into an expandable unit, etc. It should be understood, that the auxiliary ad units may modified to take any form or functionality as long as the web browser hosting the ad can be configured to render the same.

In one embodiment, the auxiliary ad units are configured to send messages back to the main unit on user interaction to transform or adjust the main ad unit's behavior. That is, auxiliary ad units can communicate bi-directionally with all the other units (i.e., main and auxiliary ad units) that are rendered on the webpage. This adds an additional layer of interactions and interdependencies between the rendered ad units.

Currently, there are no web based ad creators that have the capability to include both static and rich media content. In order to create add units with more than basic flat display ads, one must purchase a stand alone application (e.g. MACROMEDIA FLASH™, PHOTOSHOP ILLUSTRATOR™, IMAGE READER™, MICROSOFT SILVERLIGHT™, etc.) that the developer must run locally on his/her computer. By providing the ad creator application online, the developer can access the application from any computer or thin-client terminal with internet connectivity, thus adding the advantage of portability. The user is also assured that he is working on the most up to date version (and the most up to date and powerful publishing tools) of the ad creator applications. Moreover, the advertisement units designed through the web based ad creator unit can work (tie-in) and be integrated within the advertising system described herein.

Additionally, with regard to FIG. 1, during an Internet 103 web surfing session, the client 102 can access an ad creator engine that can be configured to allow the client 102 to create new ad units and modify existing ad units. That is, the client 102 can use a web browser to interface with the ad creator engine to create new ad units that can be later stored in the ad server 106 or, alternatively, modify an existing ad unit that is already stored in the ad server 106. Using the ad creator engine, the client 102 can customize the look and feel of the ad units, and define the functionalities and features that are embedded in the ad units, etc. In one embodiment, the ad creator engine is hosted in a separate ad creator server 108 that is communicatively connected to the client 102 and the ad server 106. As such, the ad creator engine can be configured to send newly created ad units to the ad server 106 for storage and delivery to the client 102 and obtain existing ad units from the ad server 106 to modify and improve. In another embodiment, the ad creator engine can be hosted by the ad server 106. In still another embodiment, the ad creator engine can be hosted on a general web application server that is not configured to provide dedicated ad unit creation or delivery services, but can nonetheless be accessed by the client 102. It should be understood that arrangements may include multiple servers of each server type (e.g., web content server 104, ad server 106, etc.) and that single servers were used in this depiction for the sake of simplicity and is not intended to limit the scenario to single server or single arrangement of servers.

Figure 2:
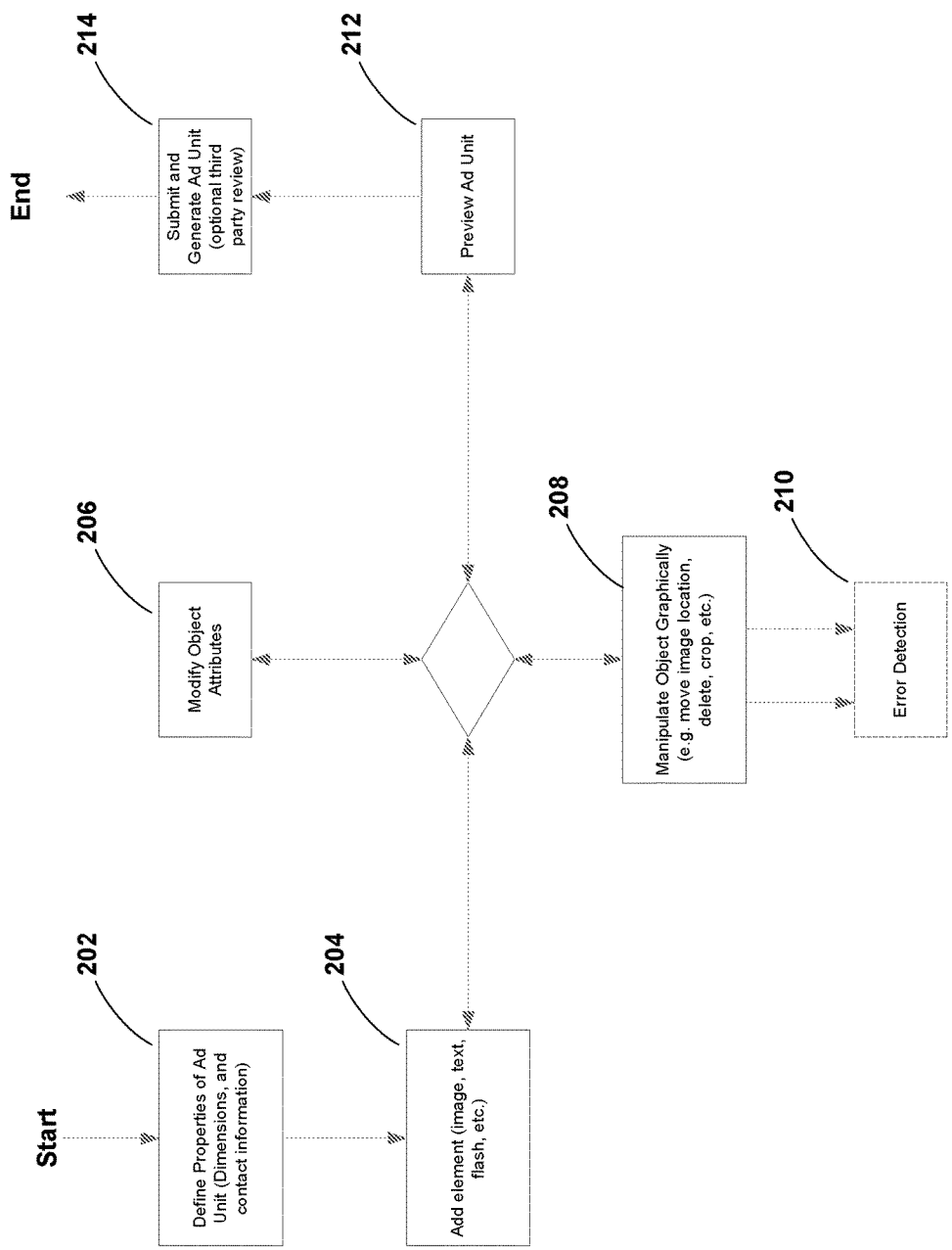
FIG. 2, is a flow chart illustrating a method to generate an advertisement unit, in accordance with one embodiment.

FIG. 2, is a flow chart illustrating a method to generate an advertisement unit, in accordance with one embodiment. A user first begins by using a web browser interface to access an ad creator engine. According to one aspect, a user could be required to authenticate their presence, for instance via a login and user name to gain access to the ad creator engine.

Once a user begins creating an advertisement unit, according to one embodiment, the user can define attributes in step 202 of the advertisement unit. Advertisement unit attributes can include, but are not limited to the dimensions of the advertisement unit and contact information associated with the advertisement unit. If a login or user identification method is employed it should be understood that data associated with the advertisement unit may be pulled from pre-existing data sources. After defining the characteristics of the advertisement unit in step 202, the user can add an object or element to the advertisement unit in step 204. An object can be an image, a graphic, text, a flash object, a movie file, a sound file, RSS feed, or another element capable of being embedded in an advertisement unit. The properties or attributes of the object can be entered by the user at the time the object is added to the advertisement unit in step 204. It should be appreciated, however, that these are but just some examples of objects that can be embedded into an ad unit. In practice, the ad creator engine can be configured to allow a client to add any type of multi-media content that can be rendered on the client's web browser.

After adding an object in step 204, a user can add more objects to the advertisement unit in step 204, the user can modify the attributes of the objects already added in step 206, or the user can manipulate the layout of the added objects in step 208. In step 210 the user can preview the entire advertisement unit. The user can add any number of objects, and may arrange the layout in various methods until the desired look and feel of the advertisement unit has been achieved.

The object can be positioned within the advertisement unit in step 210. Additional embodiments can include enhancements for adjusting objects such as more advanced image manipulation (e.g. the ability to crop, reduce in size, delete, relocate, and define a depth layer) for the object being modified. Additionally, according to another embodiment, in step 210 a warning can be triggered and displayed to the user if the user attempts to move an object outside of the dimensions defined for the advertisement unit.

In step 212 the user can preview the ad unit, and can then either return to further modify the advertisement unit or proceed to step 214 and submit the advertisement unit and generate the ad unit including any associated source code.

FIG. 3, is a screenshot illustrating a method to define the dimensions of an advertisement unit that can be included in the diagram of FIG. 2, in accordance with one embodiment. In one embodiment for creating an advertisement unit, attributes can include, but are not limited to the banner information 304 (e.g. the dimensions and name of the advertisement unit) and any contact information associated with the advertisement unit 302 (e.g. name, email, phone number). Additionally, optional security measures can be used to identify the user an restrict access. If a login or user identification method is employed it should be understood that data associated with the advertisement unit may be pulled from pre-existing data sources.

Figure 4:
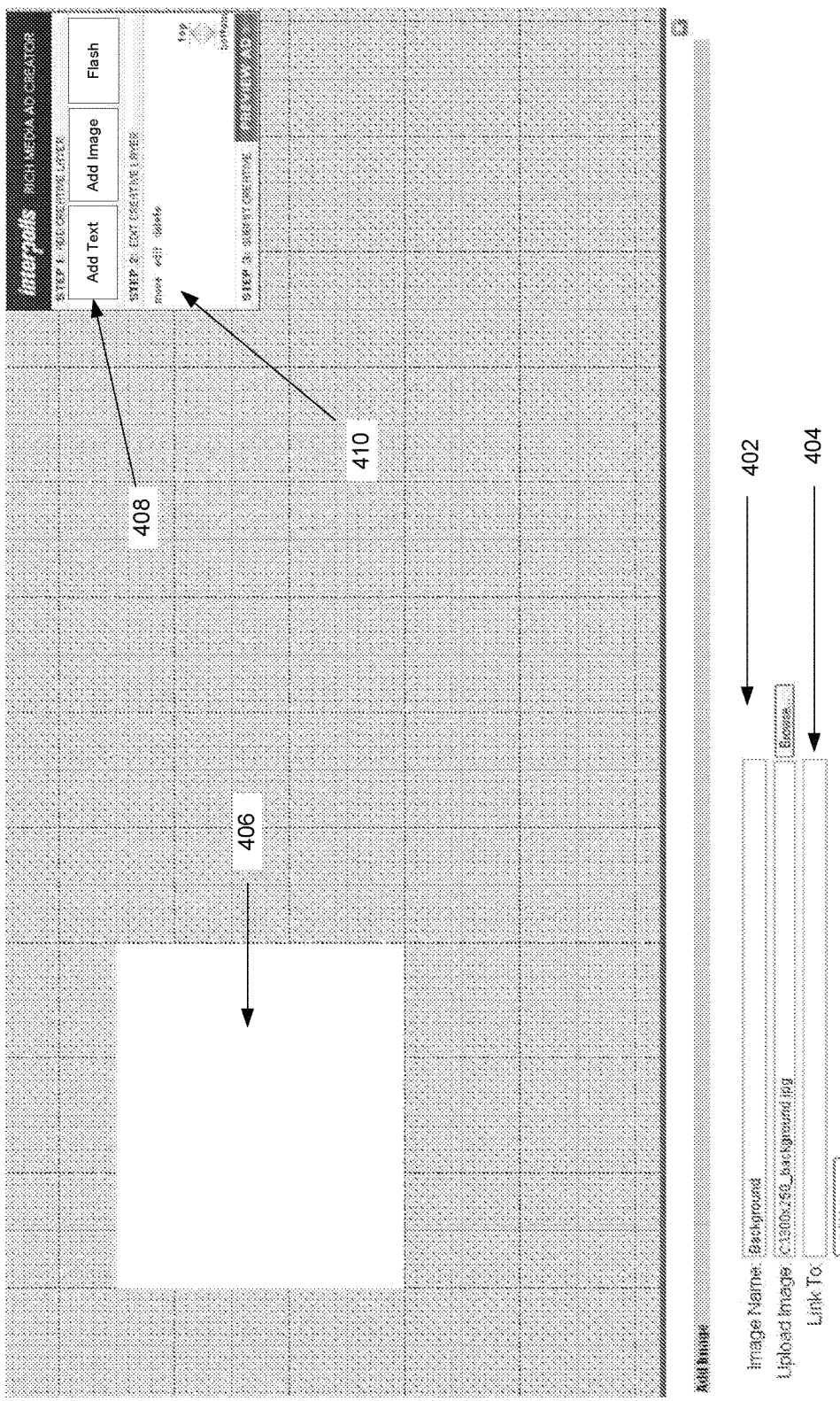
FIG. 4, is a screenshot illustrating a method to add an image that can be included in the diagram of in FIG. 2, in accordance with one embodiment.

FIG. 4, is a screenshot illustrating a method to add an image that can be included in the diagram of in FIG. 2, in accordance with one embodiment. An area on the ad creator engine webpage, as rendered in the web browser, can be designated to display a preview and editing panel 406. Additionally, the ad creator engine webpage can display options in the add creative layer 408 which can allow a user to add additional content objects. These objects can be, but are not limited to, text, images, streaming video, XML feeds, Flash objects, or widgets. Widgets are self-contained modules that offer content, services, entertainment, or interactive features like weather look-up, e-mail submission, bots, polls, games, content feeds, etc., and can be incorporated into banner creations like the other objects.

If an object has already been added the edit creative layer area 410 will permit the user to modify that object. For instance, the user could select an object to edit, move, delete, or change the depth of the object relative to other object placed in the ad unit. Additionally, upon choosing to add a new content object 408 or modify existing content 410, the properties associated with that content object can be displayed and modified by the user. Images can be uploaded from a local computer file or can be tied into a library of approved assets hosted by a third party, to the canvas/preview area 406.

Furthermore, all elements added to the canvas should be named for identification purposes 402. However it should be understood that in different embodiments different methods can be employed to generate an object name (e.g. the name can be dynamically created by the advertisement engine, the name can be entered by the user, the name could be derived from a file name associated with the object). The properties of the object may differ based on the system requirements and the specific object being added or modified. For example, if a new image was to be added the image name 402 would be displayed along with an option to select the image to be uploaded, and a field to specify a link 404 which can be associated with an image. This can be used to direct a web browser running the associated advertisement unit. For instance it could be used to create a pop-up window to display the target web link upon a user clicking on the image in the advertisement unit. Other properties and actions can be associated with object, and are not limited to the embodiments described herein.

Figure 5:
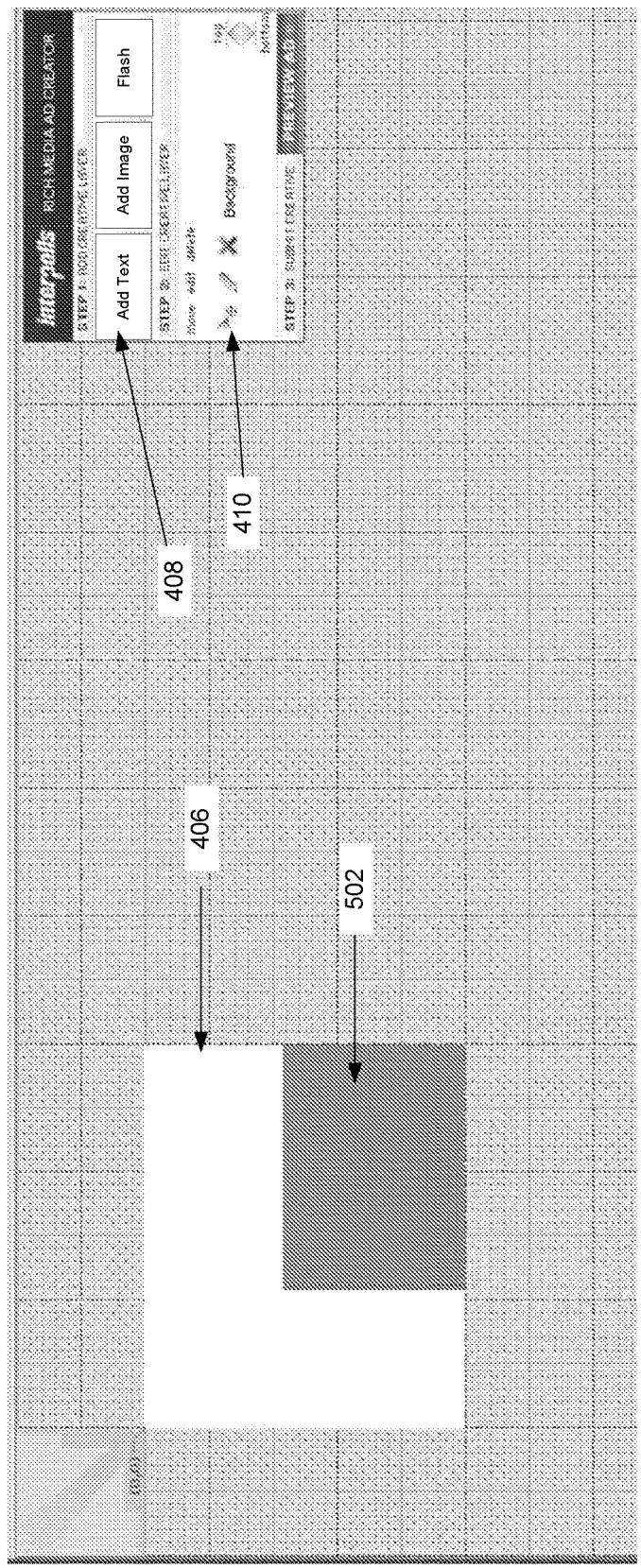
FIG. 5, is a screenshot illustrating a method to modify the layout of an object that can be included in the diagram of in FIG. 2, in accordance with one embodiment.

FIG. 5, is a screenshot illustrating a method to modify the layout of an object that can be included in the diagram of in FIG. 2, in accordance with one embodiment. A display area with an image to be moved 502 is displayed in the preview area 406 of this browser window. An add creative layer 408 and an edit creative layer 410, as describe with respect to FIG. 4, can also be viewed and utilized as described.

Simple animation of moving images from point A to point B may be included and assigned to this object. Additionally, objects can be stacked on top of each other and used can be used like a slideshow. Slideshows can be shown using a slow fade-in or fade out. The can also be setup to quickly or slowly flip through the images to allow frame-by-frame animation as well. Outside the unit movement may also be tied to their objects, such as "Expanding" or "floating" units.

Additionally, a user can select which content objects to display 504 and thereby modify. The images can appear in the canvas or display area 502. It should be understood that once a content object has been added to the canvas it can be dragged around and manipulated with a mouse or keyboard to adjust the location of the object within the advertisement unit. In other embodiments (not shown) the selected content object can be modified in other ways (e.g. cropping, resizing, adjusting the depth, etc.).

Figure 6:
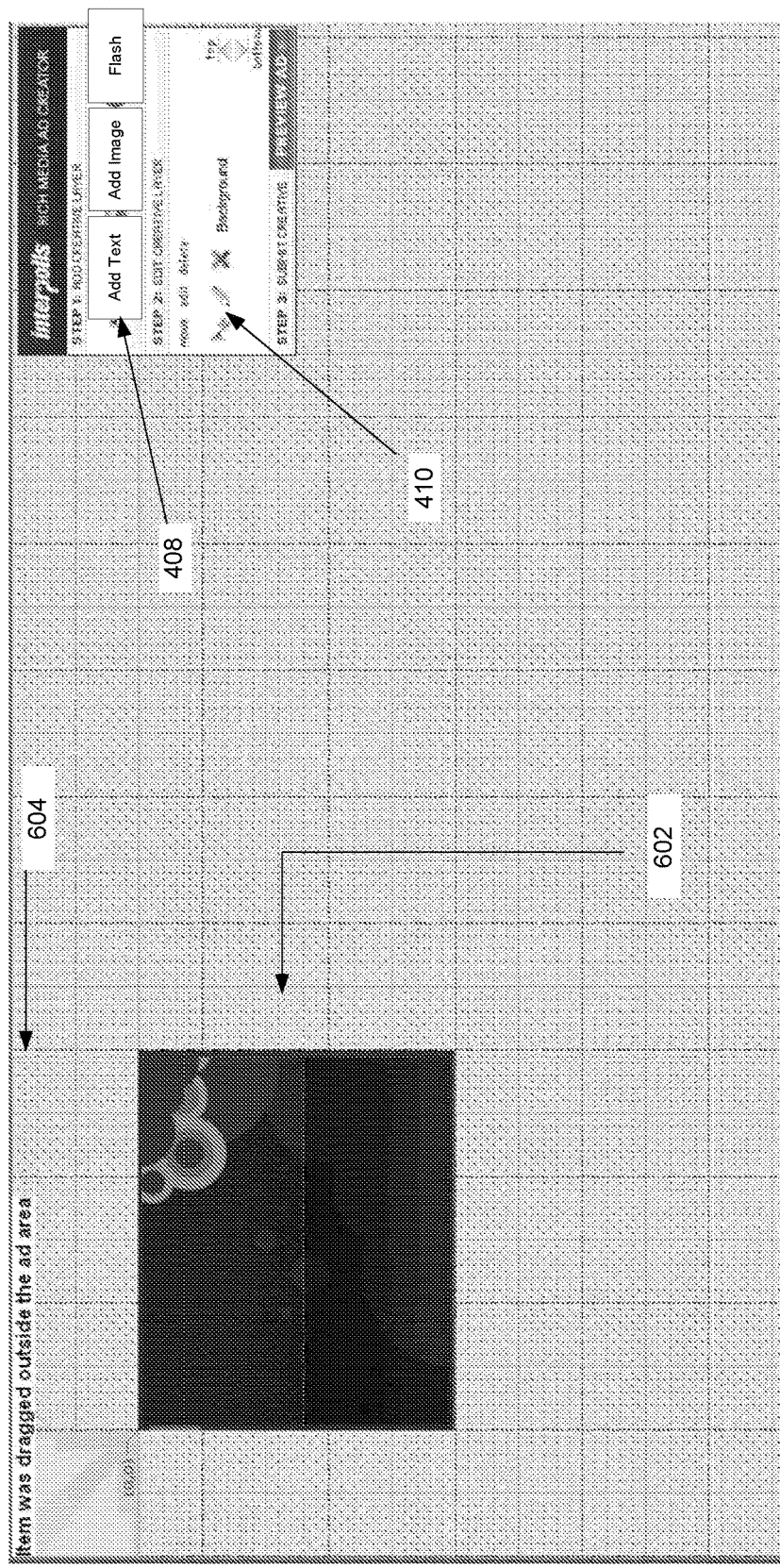
FIG. 6, is a screenshot illustrating a method to generate an error message for modifying the layout of an object outside the dimensions of the advertisement unit that can be included in the diagram of in FIG. 2, in accordance with one embodiment.

FIG. 6, is a screenshot illustrating a method to generate an error message for modifying the layout of an object outside the dimensions of the advertisement unit that can be included in the diagram of in FIG. 2, in accordance with one embodiment. This screen is an example of what can happen when elements are dragged out of the viewable area of an advertisement unit, such as a DHTML banner). In this case the object being dragged 602 can trigger an error message 604, after leaving the predefined dimensions of the advertisement unit. Additionally, the error detection element can automatically bring the element back into the viewable canvas. An add creative layer 408 and an edit creative layer 410, as describe with respect to FIG. 4, can also be viewed and utilized as described.

Figure 7:
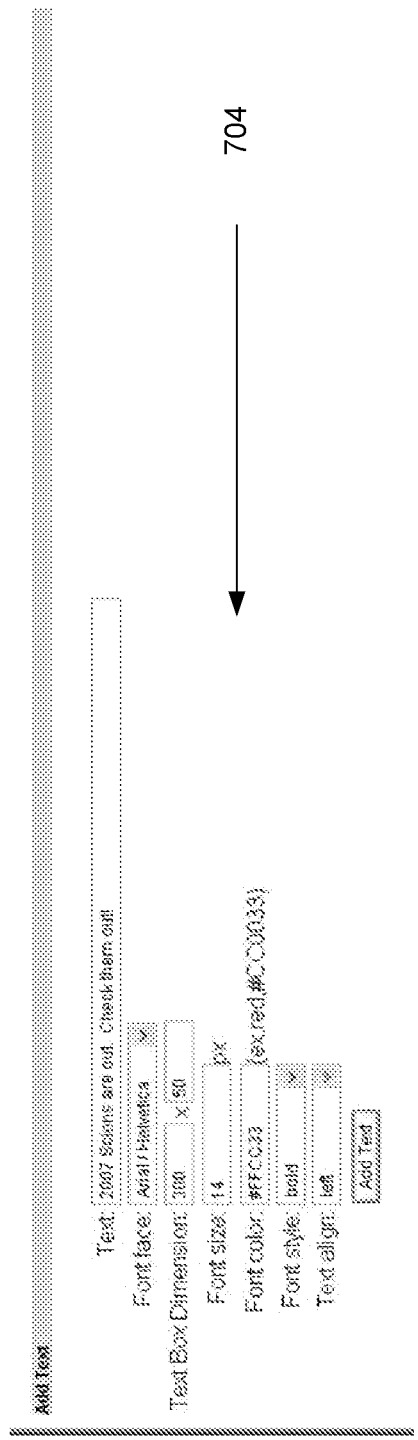
FIG. 7, is a screenshot illustrating a method to add text that can be included in the diagram of in FIG. 2, in accordance with one embodiment.
Figure 8:
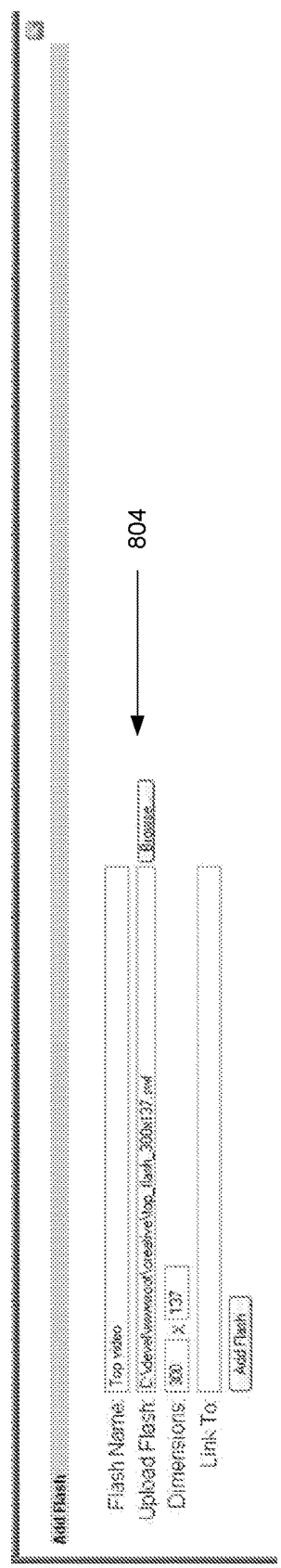
FIG. 8, is a screenshot illustrating a method to add a flash object that can be included in the diagram of in FIG. 2, in accordance with one embodiment.

FIG. 7 and FIG. 8, are screenshots illustrating an example feature to add objects that can be included in the diagram of in FIG. 2, in accordance with one embodiment. Similar to FIG. 4, which was an example of adding an image object, FIG. 7 is an example of adding a text object, and FIG. 8 is an example of adding a flash object. Other object can be included in various embodiments, however these two are included for exemplary purposes.

The properties panel can be opened as described in FIG. 4, and the attributes associated with the object can be displayed in properties text property area 704 or the flash property area 804.

These attributes associated with and displayed in the property areas are relative to the object type selected. For instance the properties can be the name of the text object, the text to be displayed, the font color, the font style (e.g. bold, italics, etc), the font size, the font color, the dimensions of the text box, the font face (e.g. Arial, etc.). Additionally, the properties associated with a flash object can be the name of the flash object, the location of the flash object, which can be used to upload the flash file to the advertisement server, the dimensions of the flash object, and a link to field which can allow the advertisement unit to trigger a redirection of a browser window or a pop-up window to navigate to the URL address specified.

The properties area of various objects can also include such information as JavaScript commands or references to other related advertisement units which can help define and control the interaction between separate but related advertisement units as describe above. It should be understood that many different attributes can be associated to various content objects and are not limited to those described herein. Furthermore, it should be noted that traditionally, most rich media banners are made using flash. However, the embodiments describe herein are not limited to flash and may be based on e.g. DHTML, which allows the use and combination of the available and latest Internet technologies to be incorporated in the ad unit. By using source code such as DHTML to create the advertisement unit, any technology which can be implemented via HTML, can be integrated into the advertisement unit. Such technology can include MACROMEDIA FLASH™, JAVA, WINDOWS MEDIA™ (e.g. movies, sound files), QUICKTIME™, but are not limited thereto. Thus, the advertisement creator engine may integrate multiple object types and is not tied to any one in particular.

Figure 9:
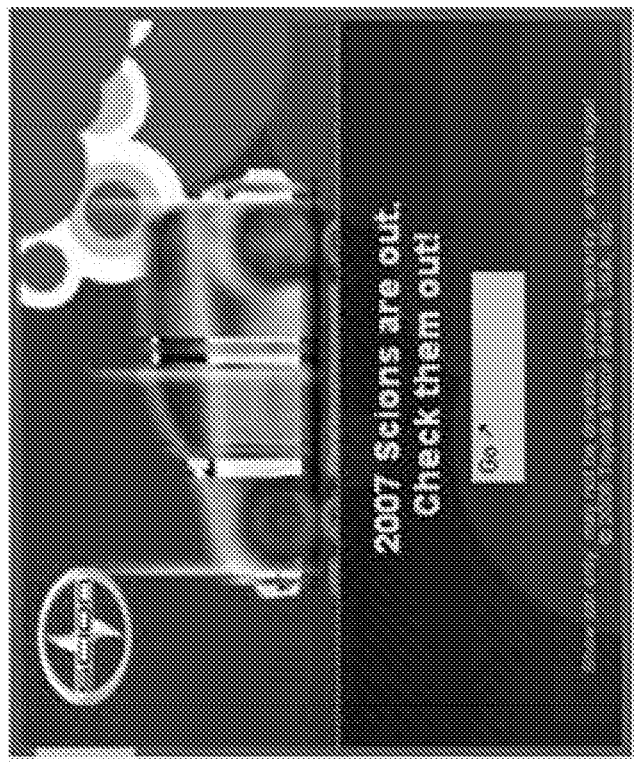
FIG. 9, is a screenshot illustrating a method to preview and advertisement unit that can be included in the diagram of in FIG. 2, in accordance with one embodiment.
Figure 9:

FIG. 9, is a screenshot illustrating a method to preview and advertisement unit that can be included in the diagram of in FIG. 2, in accordance with one embodiment. A preview pane allows the user to view his or her completed advertisement unit before submitting the final product. At this point the user can select the action they wish to take 902, e.g. to submit the advertisement or to return to editing the advertisement unit. Multiple embodiments and screen layouts are possible an FIG. 9 is merely one simplified layout for exemplary purposes.

Figure 10:
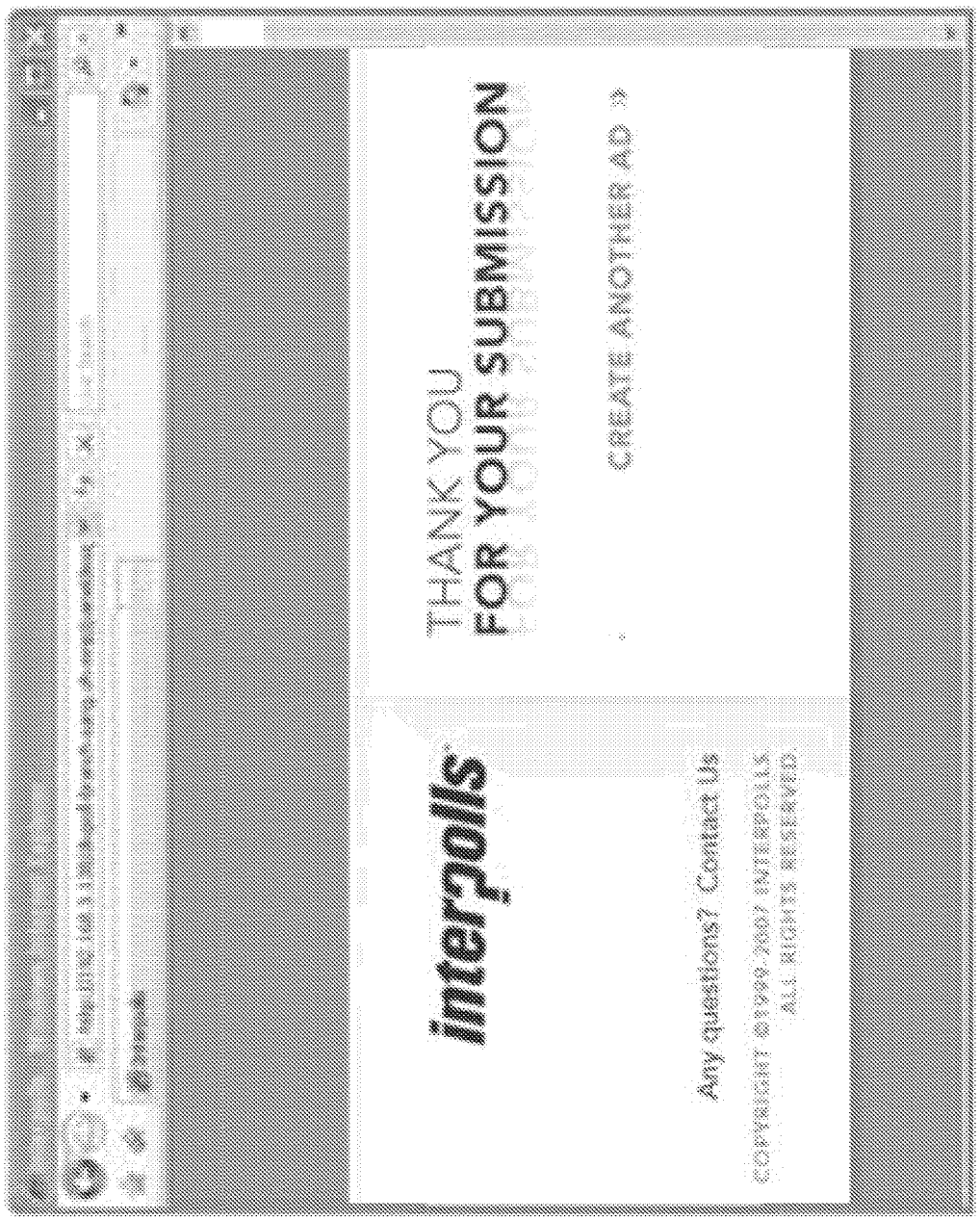
FIG. 10, is a screenshot illustrating a submission page that can be included in the diagram of in FIG. 2, in accordance with one embodiment.

FIG. 10, is a screenshot illustrating a submission page that can be included in the diagram of in FIG. 2, in accordance with one embodiment. Once an advertisement unit has been submitted, the advertisement engine can generate the source code (e.g. DHTML) and related files for the advertisement unit. The advertisement unit is the stored on a server. This server may be an advertisement server unit is created including. Because the advertisement unit is fully functional upon submission, the advertisement creator engine can be a truly self-service application which does not require any further production time. Additionally however, a third party system (e.g. individuals, or other automated programs) can verify the advertisement unit to make sure the banner meets all of the necessary specifications and requirements for its future use.

While certain embodiments have been described above, it will be understood that the embodiments described are by way of example only. Accordingly, the systems, methods, and apparatuses described herein should not be limited based on the described embodiments. Rather, the systems and methods described herein should only be limited in light of the claims that follow when taken in conjunction with the above description and accompanying drawings.

What is claimed is:

1. A system for creating a new advertisement unit, comprising:
   a web browser;
   an advertisement creator server communicatively connected to the web browser, the advertisement creator server configured to host an advertisement creator engine, the advertisement creator engine configured to create the new advertisement unit based on one or more inputs received at the advertisement creator engine via the web browser; and
   an advertisement server communicatively connected to the web browser and the advertisement creator server, the advertisement server configured to,
     store a plurality of advertisement units including the new advertisement unit, each advertisement unit of the plurality of advertisement units having data related to an online advertisement,
     receive advertisement unit requests from the web browser in response to an advertisement unit request script contained in a webpage rendered by the web browser,
     send a first advertisement unit to the web browser based on previous interactions between the web browser and the advertisement requests, and
     send a second advertisement unit to the web browser based on the advertisement requests, the second advertisement unit configured to interact bi-directionally with the first advertisement unit in response to inputs from the web browser.

2. The system of claim 1, wherein the new advertisement unit is sent to the advertisement server for storage.

3. The system of claim 2, wherein the second advertisement unit is configured to render onto the web page, and the first advertisement unit is configured to be communicatively interfaced with the second advertisement unit and configured to detect the second advertisement unit and send instructions to the second advertisement unit if the second advertisement unit shares common attributes with the first advertisement unit, and the second advertisement unit is configured to receive and execute instructions received from the first advertisement unit.

4. The system of claim 2, wherein the advertisement unit is configured to be created in response to commands from a user.

5. The system of claim 4, wherein the commands from the user comprise:
   defining a size of the advertisement unit;
   adding a content object for the advertisement unit;
   setting an attribute of the content object;

arranging the location of the content object relative to the advertisement unit;

previewing the advertisement unit; and submitting the advertisement unit.

6. The system of claim 5, wherein an error message is configured to be displayed if the location of the object is arranged outside the dimensions of the advertisement unit.

7. The system of claim 5, wherein the content object is a rich media object.

8. The system of claim 5, wherein the content object is one of:

a text object;

an image object; and a flash object.

9. The system of claim 5, wherein the attribute of the content object include at least one of:

a name of the object;

a link configured to direct a browser displaying the advertisement unit; and dimensions of the object.

* * * * *